Patented Mar. 27, 1923.

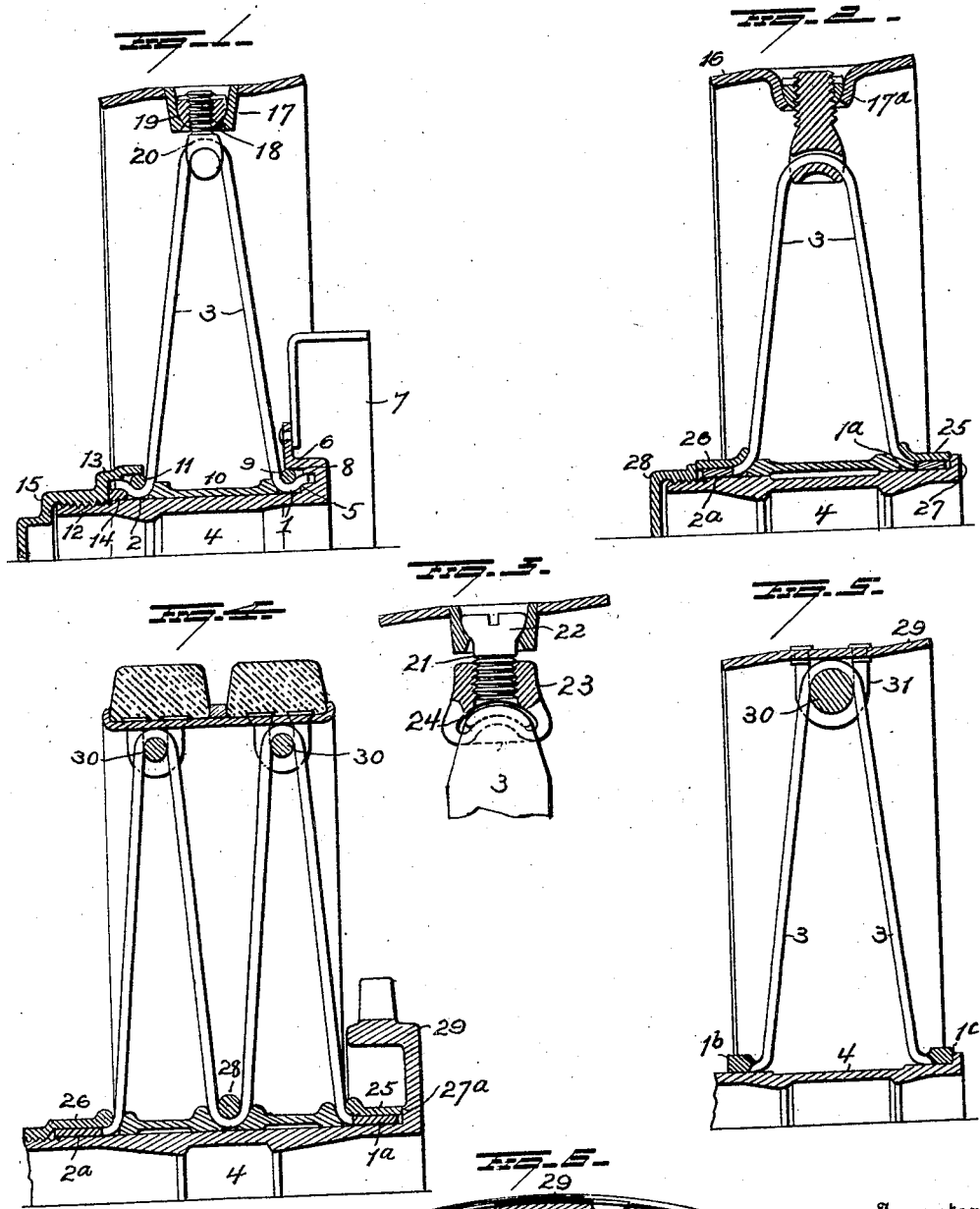

1,450,064

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA.

WHEEL STRUCTURE.

Application filed December 13, 1920. Serial No. 430,274.

*To all whom it may concern:*

Be it known that I, ETHAN I. DODDS, a citizen of the United States, and a resident of Central Valley, in the county of Orange and State of New York, have invented certain new and useful Improvements in Wheel Structures; and I do hereby declare the following to be a full, clear, and exact description of the invention, such as will enable others skilled in the art to which it appertains to make and use the same.

This invention relates to improvements in wheels and more particularly to connecting means between a sheet metal wheel body and a wheel rim and hub,—one object of my invention being to provide simple and efficient means for effecting quick and substantial connection of sheet metal spokes to a wheel rim and to provide means whereby the hub portions of a sheet metal wheel body may be easily mounted upon and securely fastened to a wheel hub.

With this and other objects in view, the invention consists in certain novel features of construction and combinations of parts as hereinafter set forth and pointed out in the claims.

In the accompanying drawings; Figure 1 is a view in section of a portion of a wheel showing an embodiment of my invention, and Figures 2, 3, 4, 5 and 6 are views showing modifications.

The sheet metal wheel body comprises hub members 1, 2 and spokes 3 made in the form of loops projecting from said hub members. The wheel body may be made from a single slit sheet metal blank and formed as shown and described in application filed by me on even date herewith and designated by Serial No. 430,270.

In the embodiment of my invention shown in Figure 1, the hub portions 1, 2, of the wheel body are curved transversely or made hook-shaped (in cross section) and mounted on a wheel hub 4. This hub is made with a shoulder 5 to form an abutment for the transversely-curved or hook-shaped hub member 1. The hub 4 is provided at one end with a flange 6 to which a brake band 7 may be secured and this flange also affords a shoulder 8. A rod or wire 9 encircles the transversely curved hub member 1 of the wheel body and holds the same in place, displacement of said rod or wire being prevented by the shoulder 8. A ring 10 encircles the hub 4 and holds the two hub members 1 and 2 of the wheel body in proper spaced positions. A rod or wire 11 also encircles the transversely curved or hook-shaped hub member. The hub 4 is made with a threaded portion 12 on which a flanged ring 13 is screwed, the flange of said ring overlying the rod or wire 11, and a filler ring 14 encircles the hub 4 between the ring 13 and the transversely curved hub member 2. Displacement of the flanged ring 13 may be prevented by a hub cap 15 screwed on the threaded portion of the hub.

The loops forming the pairs of sheet metal spokes may be flexibly and adjustably connected with a rim 16. In the embodiment of the invention shown in Figure 1 the wheel rim 16 is provided with openings having tapering walls, in which bearing sleeves 17 are supported. Each bearing sleeve is made with an interior rounded seat 18 to receive a rounded annular head 19 on a threaded connecting member 20 and the latter is made with an opening to receive the loop formed at the outer ends of and connecting the two spokes. Thus it will be seen that connecting means between the spokes and wheel rim are provided which are flexible and which are adjustable to adjust the tension of the spokes. Instead of providing separate bearing sleeves 17 for the heads of the connecting devices, the seats for said heads may be formed in enlargements 17ª projecting inwardly from the wheel rim 16 as shown in Figure 2, or the connecting devices between the spokes 3 and the rim 16 may be constructed as shown in Figure 3. In this construction, a threaded bolt 21 is employed, said bolt having a rounded head 22 mounted in the sleeve 17 (or the seat portion or enlargement 17ª). A coupling member 23 is threaded on the bolt 21 so as to be adjustable thereon and is provided with an opening 24 to receive the loop connecting two spokes.

Instead of curving the hub members 1, 2, transversely and mounting them on the hub as above described, said hub members may be left flat as shown at 1ª 2ª in Figure 2 and mounted on the wheel hub 4 as shown in said figure. In this construction, the hub members 1ª, 2ª are held in place by bands 25, 26 and displacement of these bands will be prevented by a hub flange 27 and a threaded hub cap 28 respectively. If desired, the hub members 1ᵇ, 2ᵇ of the wheel body may be made thick and mounted on the hub 4 as shown in Figure 5.

In the construction shown in Figure 4, the wheel hub 4 is provided with a sprocket or drive wheel 29 and the flat hub members 1ᵃ and 2ᵃ are held on the wheel hub in a manner similar to that shown in Figure 2, except that the hand 26 may be made integral with the hub cap and an abutment 27ᵃ in the sprocket wheel substituted for the hub flange 27 shown in Figure 2. In Figure 4 I have shown the spokes made in the form of a plurality of loops, the intermediate loops being secured to the wheel hub 4 by a rod or wire 28 surrounding said hub and welded to said intermediate loops. The outer ends of the spoke loops shown in Figure 4 may be secured to a rim (28 in Figure 4 or 29 in Figures 5 and 6) through the medium of rods or wires 30 and clips 31, the ends of the latter being riveted or otherwise secured to the wheel rim.

Having fully described my invention what I claim as new and desire to secure by Letters-Patent, is:—

1. In a wheel structure, the combination of a hub and a rim, a sheet metal wheel body comprising hub and spoke members, means connecting said hub members to the hub and means flexibly connecting the spoke members with the rim.

2. In a wheel structure, the combination with a hub and a rim, of a wheel body comprising hub members and spoke members, said hub members connected with said hub, and means flexibly connecting said spoke members with the rim.

3. In a wheel structure, the combination with a wheel hub and a rim, of a wheel body comprising hub members and spoke members, annular members surrounding the hub and securing the wheel body hub members thereto, means for preventing displacement of said annular members, and means connecting said spoke members with the rim.

4. In a wheel structure, the combination with a hub and a rim, of a wheel body comprising hub members and spoke members, said hub members being curved transversely and mounted on the hub, annular members engaging said curved hub members, means forming shoulders to engage said hub members, means for preventing displacement of said annular members, means on the hub holding said hub members spaced from each other, and means for connecting the spoke members with the rim.

5. In a wheel structure, the combination with a hub and a rim, of connected spokes connected with said hub, and coupling means connected with said connected spokes and movably connected with the rim.

6. In a wheel structure, the combination with a hub and a rim, of connected spokes connected with the hub, bearing members carried by the rim and having interior curved seats, and coupling means connected with the connected spokes and provided with rounded heads seated in said bearing members.

7. In a wheel structure, the combination with hub, and a rim, of spokes arranged to form loops and secured to the hub, bearing members carried by the rim and having interior curved seats, coupling devices comprising parts engaging the looped ends of the spoke members and parts adjustably connected with the first-mentioned parts and affording rounded heads movably mounted in said bearing members.

In testimony whereof, I have signed this specification in the presence of two subscribing witnesses.

ETHAN I. DODDS.

Witnesses:
ETHAN IRA DODDS, Jr.,
HENRY W. CROMWELL.